(12) United States Patent
Takagi

(10) Patent No.: US 9,939,304 B2
(45) Date of Patent: Apr. 10, 2018

(54) MEASURING SPOON APPARATUS

(71) Applicant: alfa TKG Co., Ltd., Tokyo (JP)

(72) Inventor: Misa Takagi, Kanagawa (JP)

(73) Assignee: ALFA TKG CO., LTD., Tokyo (JP)

( * ) Notice: Subject to any disclaimer, the term of this patent is extended or adjusted under 35 U.S.C. 154(b) by 0 days.

(21) Appl. No.: 15/464,065

(22) Filed: Mar. 20, 2017

(65) Prior Publication Data

US 2017/0191858 A1 Jul. 6, 2017

Related U.S. Application Data

(63) Continuation-in-part of application No. PCT/JP2015/075274, filed on Sep. 5, 2015.

(30) Foreign Application Priority Data

Sep. 21, 2014 (JP) ................................. 2014-192062

(51) Int. Cl.
*G01F 19/00* (2006.01)

(52) U.S. Cl.
CPC .................................. *G01F 19/002* (2013.01)

(58) Field of Classification Search
CPC ............................. G01F 19/002; G01F 19/00
USPC ......................................................... 73/426
See application file for complete search history.

(56) References Cited

U.S. PATENT DOCUMENTS

| | | | | |
|---|---|---|---|---|
| 972,777 | A * | 10/1910 | Richardson | A47G 21/06 30/147 |
| 1,998,969 | A * | 4/1935 | Schauer | A61J 7/0023 30/324 |
| 2,034,733 | A * | 3/1936 | Wilkins | G01N 1/08 30/324 |
| 2,456,858 | A * | 12/1948 | Bolling | A47G 21/06 24/697.1 |
| 2,496,268 | A * | 2/1950 | Chester | G01F 19/002 73/429 |
| 3,121,951 | A * | 2/1964 | Green | A47G 21/02 30/149 |
| 4,043,203 | A | 8/1977 | Montesi | |
| 4,539,749 | A * | 9/1985 | Hyeong-Woon | A47G 21/06 30/147 |
| 8,322,523 | B2 * | 12/2012 | Palmer | A45C 11/008 206/37.1 |

(Continued)

FOREIGN PATENT DOCUMENTS

| | | |
|---|---|---|
| GB | 1557448 A | 12/1979 |
| JP | 1095356 S | 10/2000 |
| JP | 5196481 B2 | 5/2013 |

(Continued)

*Primary Examiner* — Harshad R Patel
*Assistant Examiner* — Jamel Williams
(74) *Attorney, Agent, or Firm* — IDP Patent Services; Olav M. Underdal

(57) ABSTRACT

A measuring spoon device includes a rear shaft with a tapered end portion, elongated apertures, guide grooves, a rear connector section; a divider section with apertures; slidable spoon assemblies with push members, including finger button protrusions, and measuring spoons, including spoon portions and spoon stems; and a front cylindrical section; such that the measuring spoons can be retracted for storage inside the front cylindrical section, and can be extracted for use in measuring a plurality of seasonings.

19 Claims, 4 Drawing Sheets

(56) References Cited

U.S. PATENT DOCUMENTS

| | | | | |
|---|---|---|---|---|
| 8,635,780 B1* | 1/2014 | Abul | ................... | B26B 11/00 |
| | | | | 30/125 |
| 2015/0257561 A1* | 9/2015 | Miksovsky | ............ | A47G 21/06 |
| | | | | 30/150 |

FOREIGN PATENT DOCUMENTS

| | | | | |
|---|---|---|---|---|
| JP | 5735774 B2 | 6/2015 | | |
| WO | WO 2016043073 A1 * | 3/2016 | ............. | G01F 19/00 |

* cited by examiner

MEASURING SPOON APPARATUS

CROSS-REFERENCE TO RELATED APPLICATIONS

This U.S. Non-Provisional Application is a continuation-in-part of International PCT Application No. PCT/JP2015/075274, filed Sep. 5, 2015, which claims the benefit of Japan Application No. 2014-192062, filed Sep. 21, 2014;

FIELD OF THE INVENTION

The present invention relates generally to the field of measuring spoons and related devices, and more particularly to methods and systems for housing a plurality of measuring spoons within one device.

BACKGROUND OF THE INVENTION

Measuring spoons for measuring seasonings and the like are often used in a kitchen. However, for such use a cook may need to store a plurality of measuring spoons in the kitchen in a common storage location, such as a drawer.

However, often a particular size or type of measuring spoon may not be available, or may have been misplaced in the kitchen.

As such, considering the foregoing, it may be appreciated that there continues to be a need for novel and improved devices and methods for housing a plurality of measuring spoons within one device.

SUMMARY OF THE INVENTION

The foregoing needs are met, to a great extent, by the present invention, wherein in aspects of this invention, enhancements are provided to the existing model of the field of measuring spoons and related devices.

In an aspect, a measuring spoon device can include:
a) a rear shaft, including:
  elongated apertures, which are elongated in an axial direction of the rear shaft, and positioned in a rear part of the rear shaft;
  a rear connector section, which is positioned in a front end of the rear shaft;
b) slidable spoon assemblies, including:
  elongated push members, each corresponding push member including:
    a finger button protrusion, which is connected to a rear end of the corresponding push member;
    wherein the rear end is mounted inside the rear shaft, such that the finger button protrusion protrudes through an elongated aperture of the plurality of elongated apertures; and
  a plurality of measuring spoons, including:
    a spoon portion; and
    a spoon stem;
    such that the spoon portion is connected to a front end of the spoon stem;
    wherein each measuring spoon of the plurality of measuring spoons is detachably connected to a corresponding elongated push member, such that a rear end of a corresponding spoon stem is detachably connected to a front end of a corresponding elongated push member; and
c) a front cylindrical section having a front cylinder opening, the front cylindrical section further including:
  a front connector section, which is positioned in a rear end of the front cylindrical section;
  wherein the front and rear connector sections are detachably connected;
  wherein the measuring spoon device is configured such that when a finger button protrusion is pressed rearward, a corresponding slidable spoon assembly moves rearward, such that a corresponding spoon portion and a corresponding spoon stem is positioned inside the front cylindrical section, whereby the corresponding spoon portion is retracted for storage;
  wherein the measuring spoon device is configured such that when the finger button protrusion is pressed frontward, the corresponding slidable spoon assembly moves frontward, such that the corresponding spoon portion moves through the front cylinder opening, such that the corresponding spoon portion and at least a part of the corresponding spoon stem is positioned in front of the front cylindrical section, whereby the corresponding spoon portion is extracted for use.

In related aspects, the measuring spoon device of the present invention is configured in a manner such that a plurality of measuring spoons having different volume are housed movably in a cylinder.

In other related aspects, a plurality of measuring spoons having different volume comprising a push member at its rear end are configured to be housed movably in the cylinder and to be taken out from an opening at an end of the cylinder by an operation of pressing down a finger button protrusion that is attached to a push member that is exposed from an elongated aperture of the rear end of the cylinder.

In further related aspects, one of the measuring spoons is engaged in a manner such that the measuring spoon protrudes out from the opening of the end of the cylinder.

In related aspects, by housing a plurality of measuring spoons having different volume movably, the measuring spoon device can measure a plurality of seasonings at the same time without a need to wash the spoon between measurements.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
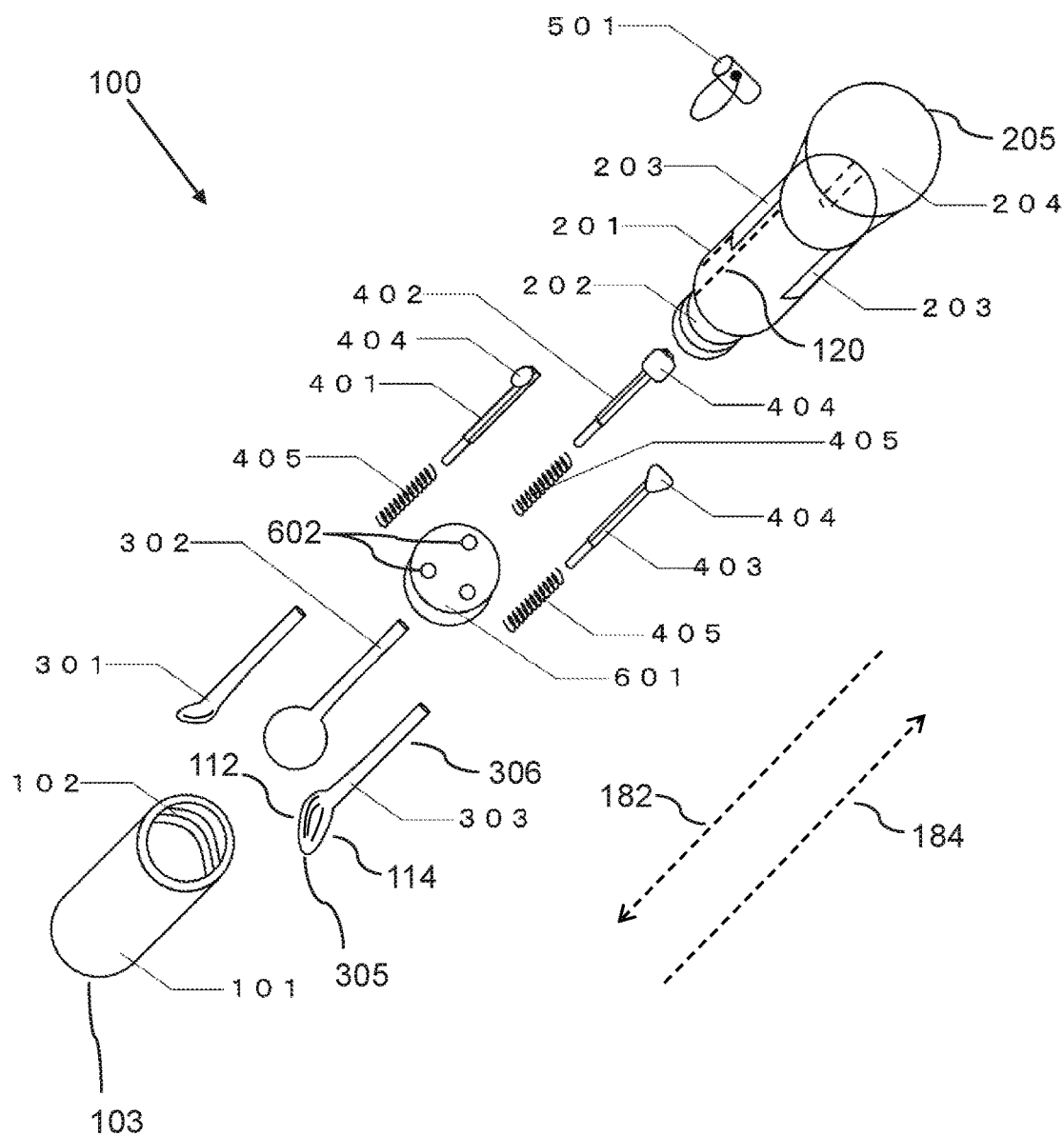
FIG. 1 shows an exploded perspective view of parts of a measuring spoon device, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a measuring spoon device 100 with reference to FIG. 1, in such manner that like reference numerals refer to like components throughout; a convention that we shall employ for the remainder of this specification.

Figure 2:
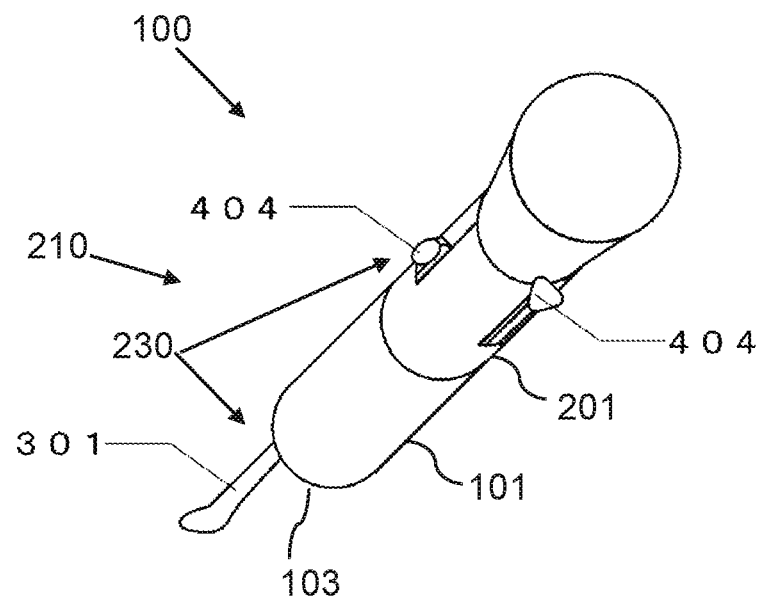
FIG. 2 shows a perspective view of a measuring spoon device with a first measurement spoon extracted, according to an embodiment of the invention.
Figure 4:
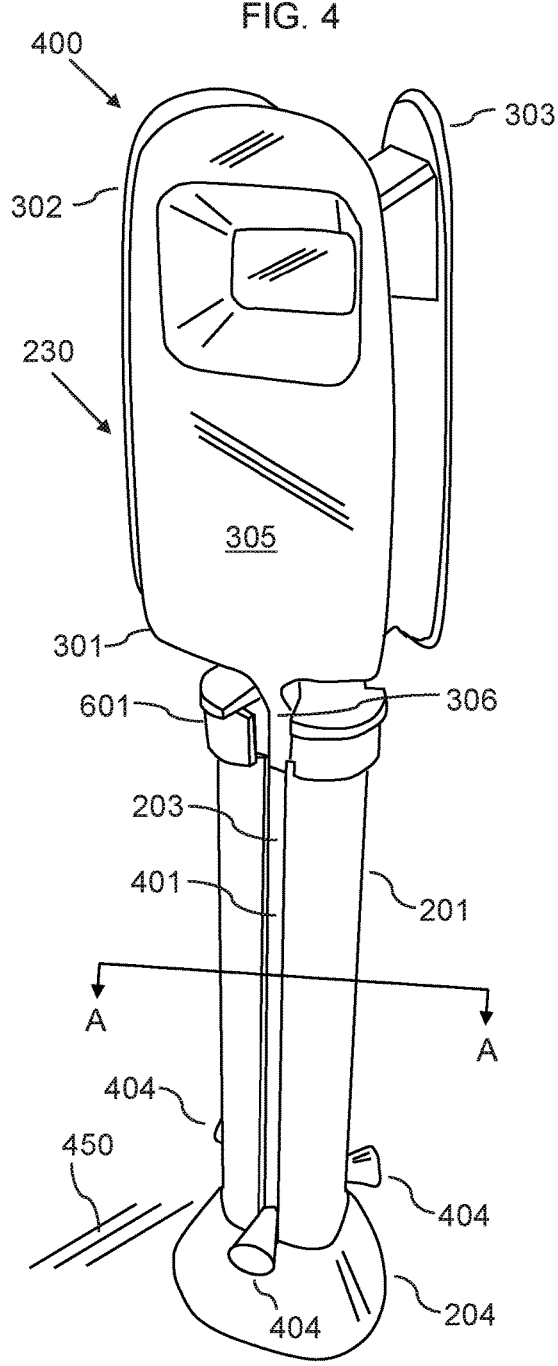
FIG. 4 shows a perspective view of a measuring spoon device with all measurement spoons retracted, according to an embodiment of the invention.

In an embodiment, as shown in FIG. 1, a measuring spoon device 100 can include:
a) a rear shaft 201, which can be hollow, and can further be cylindrical, the rear shaft 201 including:
   i. A tapered end portion 204, which is configured with a flat outer edge 205 or surface 205 to allow for the measuring spoon device 100 to stand on a flat surface 450, such as a kitchen countertop, as shown in FIG. 4;
   ii. A plurality of elongated apertures 203 that are elongated in an axial direction of the rear shaft 201, and positioned in a rear part of the rear shaft 201;
   iii. A plurality of guide grooves 120, which can also be referred to as guide channels 120, such that each elongated aperture 203 provides access to a guide groove 120;
   iv. A rear connector section 202, positioned in a front end of the rear shaft 201, which can be configured as a male threaded section;
b) A divider section 601, which can be configured as a circular disc 601, which can also be referred to as a divider member 601, or divider 601, which can further include:
   a. a plurality of divider apertures 602;

c) a plurality of slidable spoon assemblies 230, as shown in FIG. 2, including:
   i. a plurality of elongated push members 401 402 403, which also can be referred to as push pins 401 402 403, which are elongated pieces, each respective push member 401 402 403 further including:
      a finger button protrusion 404, which is connected to a rear end of the respective push member 401 402 403;
      wherein the rear end is mounted inside the rear shaft 201, such that the finger button protrusion 404 protrudes through a corresponding elongated aperture 203 of the plurality of elongated apertures 203, such that the elongated apertures 203 allow the slidable spoon assemblies 230 to slide frontward 182 and rearward 184; and
   ii. A plurality of measuring spoons 301 302 303, including:
      a spoon portion 305, also referred to as a measuring member 305; and
      a spoon stem 306;
      such that the spoon portion 305 is connected to a front end of the spoon stem 306;
   wherein each of the measuring spoons 301 302 303 is detachably connected to a corresponding elongated push member 401 402 403, such that rear ends of spoon stems 306 are detachably connected to front ends of the elongated push members 401 402 403;
d) A front cylindrical section 101, including:
   v. a front connector section 102, positioned in a rear end of the front cylindrical section 101, which front connector section 102 can be configured as a female threaded section;
wherein the front and rear connector sections 102 202 are detachably connected, for example such that the front and rear connector sections 102 202 are screwed together, such that the divider section 601 is mounted between the front and rear shafts 101 201;
wherein each slidable spoon assembly 230 penetrates through a divider aperture 602, such that the elongated push members 401 402 403 can slide frontward 182 and rearward 184 inside a respective divider aperture 602, such that each elongated push member is guided by a guide groove 120, and can move slidable inside the guide groove 120;
such that, when a finger button protrusion 404 is pressed rearward 184, a corresponding slidable spoon assembly 230 moves rearward 184, such that the corresponding spoon portion 305 and the corresponding spoon stem 306 is positioned inside the front cylindrical section 101, whereby the corresponding spoon portion 305 is retracted for storage;
such that, when the finger button protrusion 404 is pressed frontward 182, the corresponding slidable spoon assembly 230 moves frontward 182, such that the corresponding spoon portion 305 moves through the front cylinder opening 103, such that the corresponding spoon portion 305 and at least a part of the corresponding spoon stem 306 is positioned in front of the front cylindrical section 101, whereby the corresponding spoon portion 305 is extracted for use.

In a related embodiment, the front cylindrical section 101, can be provided with a slip resistant coating.

In another related embodiment, the front cylindrical section 101 and the rear shaft 201 may be connectable by other connecting mechanisms or alternatively may be configured as one integrated cylindrical section 210.

In a related embodiment, the rear shaft 201 can be configured with a ring 501 or a hook for attaching the measuring spoon device 100 on a wall of a kitchen or the like (FIG. 1) shows the ring 501).

In a related embodiment, the front cylindrical section 101 and the rear shaft 201 can comprises in their interiors a sufficient space such that a plurality of measuring spoons, such as measuring spoon 301, measuring spoon 302 and measuring spoon 303, can be movably housed.

Figure 3:
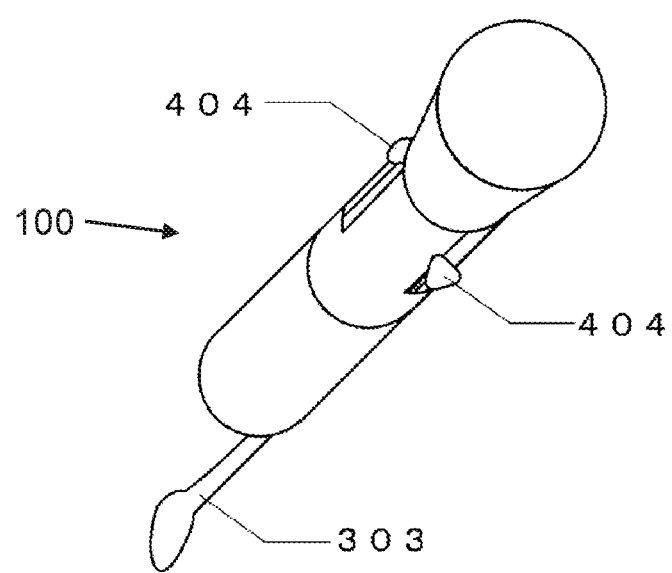
FIG. 3 shows a perspective view of a measuring spoon device with a second measurement spoon extracted, according to an embodiment of the invention.

In a related embodiment, the plurality of measuring spoons 301 302 303 can be positioned in the cylinder 210 such that outer/convex portions 112 of the spoon portions 305 are opposedly positioned, such that the spoon portions 305 are positioned in a back-to-back configuration, with outer/convex portions 112 facing a central axis of the measuring spoon device 100, as shown in FIGS. 1-3. This is to prevent that a measuring spoon 301 302 303 may be smirched by a seasoning deposit of another measuring spoon 301 302 303. However, alternatively, in order to make the front cylindrical section 101 and the rear shaft 201 thinner, the measuring spoons 301 302 303 can be configured to be positioned in the cylinder 210 such that inner/depressed/concave portions 114 of the measuring spoon 301 302 303 are opposedly positioned.

In a related embodiment, a rear part of each measuring spoon protrudes from a front cylinder opening 103 provided at a front end of the front cylindrical section 101 and each push member 401 402 403 can be exposed from the elongated aperture 203 provided at a rear end of the rear shaft 201 respectively.

In a related embodiment, each push member 401 402 403 can be configured with a finger button protrusion 404, such that a push member 401 402 403 and the connected measuring spoon 301 302 303 is pushed frontward 182 by when the finger button protrusion 404 is pressed frontward 182, along the direction of the guide groove 120.

In a related embodiment, the finger button protrusion 404 can be configured with different shapes for each connected measuring spoon 301 302 303. The shape of the protrusion can enable a user to identify the volume and/or type of the measuring spoons.

In another related embodiment, the finger button protrusion 404 can be configured with different colors, to identify the volume and/or type of the measuring spoons.

In a related embodiment, as shown in FIG. 2, each measuring spoon 301 302 303 can be either:
  a) Extracted, such that the measuring member 305, also referred to as spoon portion 305, of the measuring spoon 301 302 303 protrudes out of the front cylinder opening 103 of the front end of the front cylindrical section 101 (in a state such that measurement can be done by the protruding measuring spoon);
  b) Retracted, such that the measuring member 305 of the measuring spoon 301 302 303 is positioned in an interior of the front cylindrical section 101.

In a related embodiment, a plurality of engaging protrusions (not shown) can be configured radially inwardly from the rear shaft 201 (on the opposite side of the side having the finger button protrusion 404) adjacent to the rear end of each push member 401 402 403.

In a related embodiment, when a user put his finger on the finger button protrusion 404 of the push member 401 402 403 and pushes frontward 182, an engaging protrusion provided at the push member of the unit pushed down and the push member of the other unit are meshed (i.e. engaged/connected) with each other and engaged in a manner such that the measuring portion at the leading end of the measuring spoon connected to the front end of the unit is let out from the front cylinder opening 103 at the front end of the front cylindrical section 101.

In a related embodiment, the divider section 601 can be configured inside rear shaft 201 to divide an inside space of the rear shaft 201 into a front interior and a rear interior.

FIG. 1 shows an example embodiment with three divider apertures 602 configured for three measuring spoons 301 302 303.

In a related embodiment, each measuring spoon 301 302 303 can be dismounted from its corresponding push members 401 402 403, such that the measuring spoon 301 302 303 can be washed or replaced.

In a related embodiment, each slidable spoon assembly 230 can further include a spring 405, which is mounted between the connected push member 401 402 403 and the measuring spoon 301 302 303, such that the elongated push members 401 402 403 penetrates through the spring, such that the spring is mounted rearward of the divider, such that the spring is compressed when the finger button protrusion 404 is pushed frontward 182.

In a related embodiment, as shown in FIG. 2, when the measuring spoon of one unit (FIG. 2 shows the measuring spoon 301) is extracted, by putting down lightly another unit by putting a finger on the finger button protrusion 404, the mesh of the engaging protrusion provided at the push member of the unit that has been let out and the engaging protrusion provided at the push member of the other unit is released and the push member of the unit that has been let out is returned to its original position by flexibility of the spring 405 that has been compressed between the divider section 601 and the push member 401 402 403.

Thereafter, by pressing frontward 182 the unit to the lowest level of the elongated aperture 203, the engaging protrusion provided to the push member of the other unit and the engaging protrusion provided the push member of a unit that has been let out are meshed with each other so that the unit is engaged in a manner that the measuring spoon 303 of the other unit is extracted, as shown in FIG. 3.

In an alternative embodiment, FIG. 4 shows a measuring spoon device 400, which does not include a front cylindrical section 101. The measuring spoon device 400 is here shown with the measuring spoons 301 302 303 in a retracted state.

Figure 5:
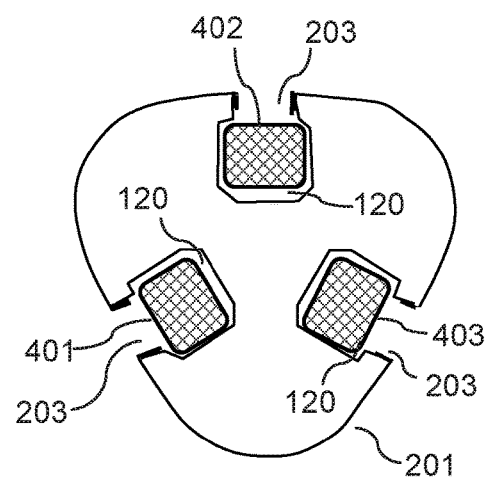
FIG. 5 shows a perspective view of a rear cylinder of a measuring spoon device, taken along section line A-A of FIG. 4, according to an embodiment of the invention.

In a related embodiment, FIG. 5 shows a cross-sectional view of the rear shaft 201 of the measuring spoon device 400, showing the push members 401 402 403 slidably mounted inside the guide grooves 120.

Figure 6:
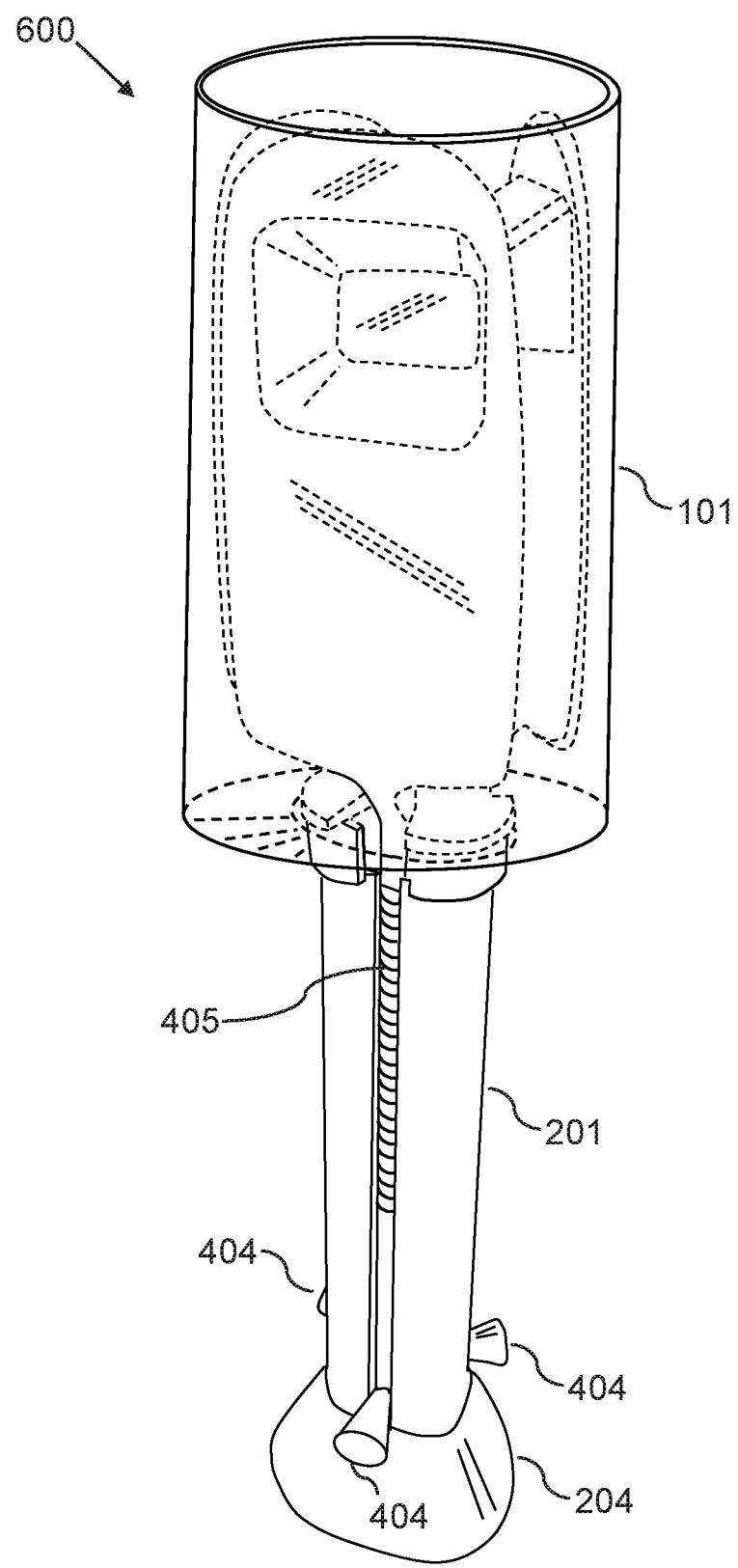
FIG. 6 shows a perspective view of a measuring spoon device with all measurement spoons retracted, according to an embodiment of the invention.

In another related embodiment, FIG. 6 shows a measuring spoon device 600, which includes the measuring spoon device 400 with a front cylindrical section 101 attached. The measuring spoon device 600 further includes springs 405, to facilitate retraction of the measuring spoons 301 302 303.

In various related embodiments, the measuring spoon device 100 can have industrial applicability and utility as a measuring spoon device that is capable of measuring a plurality of seasonings at the same time. The usage of the measuring spoon device 100 is not limited to cooking and thus the measuring spoon device 100 is capable of being applied to measuring any powder or liquid, for use in industry, manufacturing, laboratories, etc.

Here has thus been described a multitude of embodiments of the measuring spoon device 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For instance, as already known, it may be configured that by pressing a button, the measuring spoon pops out using a mechanism of the spring or the like and the used measuring spoon is housed by pressing into the front cylindrical section 101 and the rear shaft 202 by the user's hand.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A measuring spoon device, comprising:
   a) a rear shaft, comprising:
      a plurality of elongated apertures, which are elongated in an axial direction of the rear shaft, and positioned in a rear part of the rear shaft;
      a rear connector section, which is positioned in a front end of the rear shaft;
   b) a plurality of slidable spoon assemblies, comprising:
      a plurality of elongated push members, each corresponding push member further comprising:
         a finger button protrusion, which is connected to a rear end of the corresponding push member;
         wherein the rear end is mounted inside the rear shaft, such that the finger button protrusion protrudes through an elongated aperture of the plurality of elongated apertures; and
      a plurality of measuring spoons, including:
         a spoon portion; and
         a spoon stem;
         such that the spoon portion is connected to a front end of the spoon stem;
         wherein each measuring spoon of the plurality of measuring spoons is detachably connected to a corresponding elongated push member, such that a rear end of a corresponding spoon stem is detachably connected to a front end of a corresponding elongated push member; and
   c) a front cylindrical section having a front cylinder opening, the front cylindrical section further comprising:
      a front connector section, which is positioned in a rear end of the front cylindrical section;
   wherein the front and rear connector sections are detachably connected;
   wherein the measuring spoon device is configured such that when a finger button protrusion is pressed rearward, a corresponding slidable spoon assembly moves rearward, such that a corresponding spoon portion and a corresponding spoon stem is positioned inside the front cylindrical section, whereby the corresponding spoon portion is retracted for storage;
   wherein the measuring spoon device is configured such that when the finger button protrusion is pressed frontward, the corresponding slidable spoon assembly moves frontward, such that the corresponding spoon portion moves through the front cylinder opening, such that the corresponding spoon portion and at least a part of the corresponding spoon stem is positioned in front of the front cylindrical section, whereby the corresponding spoon portion is extracted for use.

2. The measuring spoon device of claim 1, wherein the rear shaft further comprises:
   a tapered end portion, which is configured with a flat outer surface to allow for the measuring spoon device to stand on a flat surface.

3. The measuring spoon device of claim 1, wherein the rear connector section is configured as a male threaded section and the front connector section is configured as a female threaded section, such that the front and rear connector sections are screwed together.

4. The measuring spoon device of claim 1, further comprising:
   a divider section, further comprising:
      a plurality of divider apertures;
   wherein the divider section is mounted between the front and rear shafts;
   wherein each slidable spoon assembly penetrates through a divider aperture in the plurality of divider apertures.

5. The measuring spoon device of claim 4, wherein each slidable spoon assembly further comprises a spring, which is mounted between the connected push member and the measuring spoon, such that the corresponding push member penetrates through the spring, such that the spring is mounted rearward of the divider section, such that the spring is compressed when the finger button protrusion is pushed frontward.

6. The measuring spoon device of claim 1, wherein the divider section is configured as a circular disc.

7. The measuring spoon device of claim 1, wherein a rear end of the spoon stem is configured to slide over a front end of the corresponding push member.

8. The measuring spoon device of claim 1, wherein the plurality of slidable spoon assemblies comprises three slidable spoon assemblies, such that the plurality of elongated apertures comprises three elongated apertures, which are positioned symmetrically around the rear part of the rear shaft.

9. The measuring spoon device of claim 1, wherein the rear shaft further comprises:
   a plurality of guide grooves, such that each elongated aperture provides access to a guide groove;
   wherein each elongated push member is guided by a guide groove, and is configured to move slidably inside the guide groove.

10. The measuring spoon device of claim 1, wherein the plurality of measuring spoons are positioned such that outer/convex portions of the spoon portions are opposedly positioned, in a back-to-back configuration.

11. A measuring spoon device, comprising:
    a) a rear shaft, comprising:
       a plurality of elongated apertures, which are elongated in an axial direction of the rear shaft, and positioned in a rear part of the rear shaft; and
    b) a plurality of slidable spoon assemblies, comprising:
       a plurality of elongated push members, each corresponding push member further comprising:
          a finger button protrusion, which is connected to a rear end of the corresponding push member;
          wherein the rear end is mounted inside the rear shaft, such that the finger button protrusion protrudes through an elongated aperture of the plurality of elongated apertures; and
       a plurality of measuring spoons, including:
          a spoon portion; and
          a spoon stem;
          such that the spoon portion is connected to a front end of the spoon stem;

wherein each measuring spoon of the plurality of measuring spoons is detachably connected to a corresponding elongated push member, such that a rear end of a corresponding spoon stem is detachably connected to a front end of a corresponding elongated push member; and wherein the measuring spoon device is configured such that when a finger button protrusion is pressed rearward, a corresponding slidable spoon assembly moves rearward, whereby the corresponding spoon portion is retracted for storage;

wherein the measuring spoon device is configured such that when the finger button protrusion is pressed frontward, the corresponding slidable spoon assembly moves frontward, whereby the corresponding spoon portion is extracted for use.

12. The measuring spoon device of claim 11, further comprising:
   a front cylindrical section having a front cylinder opening, the front cylindrical section further comprising:
      a front connector section, which is positioned in a rear end of the front cylindrical section;
   wherein the rear shaft further comprises a rear connector section, which is positioned in a front end of the rear shaft;
   wherein the front and rear connector sections are detachably connected;
   such that the corresponding spoon portion and the corresponding spoon stem is positioned inside the front cylindrical section, when the corresponding spoon portion is retracted for storage;
   such that the corresponding spoon portion moves through the front cylinder opening, such that the corresponding spoon portion and at least a part of the corresponding spoon stem is positioned in front of the front cylindrical section, when the corresponding spoon portion is extracted for use.

13. The measuring spoon device of claim 12, wherein the rear connector section is configured as a male threaded section and the front connector section is configured as a female threaded section, such that the front and rear connector sections are screwed together.

14. The measuring spoon device of claim 11, wherein the rear shaft further comprises:
   a tapered end portion, which is configured with a flat outer surface to allow for the measuring spoon device to stand on a flat surface.

15. The measuring spoon device of claim 11, further comprising:
   a divider section, further comprising:
      a plurality of divider apertures;
   wherein the divider section is mounted in a front of the rear shaft;
   wherein each slidable spoon assembly penetrates through a divider aperture in the plurality of divider apertures.

16. The measuring spoon device of claim 15, wherein each slidable spoon assembly further comprises a spring, which is mounted between the connected push member and the measuring spoon, such that the corresponding push member penetrates through the spring, such that the spring is mounted rearward of the divider section, such that the spring is compressed when the finger button protrusion is pushed frontward.

17. The measuring spoon device of claim 11, wherein the rear shaft further comprises:
   a plurality of guide grooves, such that each elongated aperture provides access to a guide groove;
   wherein each elongated push member is guided by a guide groove, and is configured to move slidably inside the guide groove.

18. A measuring spoon device, comprising:
   a plurality of measuring spoons having different volumes and housed movably in a cylinder; and
   a plurality of push members, each comprising a finger button protrusion, wherein the plurality of measuring spoons each are connected to a push member at a rear end of each measuring spoon, such that a measuring spoon is configured to protrude out from an opening at an end of the cylinder by an operation of pressing down the finger button protrusion that is exposed from an elongated aperture of the rear end of the cylinder.

19. The measuring spoon device of claim 18, wherein one of the measuring spoons is engaged in a manner such that the spoon is let out from the opening of the end of the cylinder by a mesh of the finger button protrusion of the push member and an engaging protrusion provided on an opposite side of the finger button protrusion.

* * * * *